US011086585B2

(12) United States Patent
Mitsubuchi et al.

(10) Patent No.: US 11,086,585 B2
(45) Date of Patent: Aug. 10, 2021

(54) INFORMATION PROCESSING DEVICE, INFORMATION PROCESSING METHOD AND STORAGE MEDIUM

(71) Applicant: NS Solutions Corporation, Tokyo (JP)

(72) Inventors: Takashi Mitsubuchi, Tokyo (JP); Masaru Yokoyama, Tokyo (JP); Shinya Ishikawa, Tokyo (JP); Yukimasa Kiya, Tokyo (JP); Yuki Toba, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 16/837,791

(22) Filed: Apr. 1, 2020

(65) Prior Publication Data

US 2020/0326901 A1 Oct. 15, 2020

(30) Foreign Application Priority Data

Apr. 10, 2019 (JP) .............................. JP2019-074862

(51) Int. Cl.
*G05B 19/418* (2006.01)
*G06N 3/04* (2006.01)
*G06F 3/14* (2006.01)
*G06F 3/147* (2006.01)
(Continued)

(52) U.S. Cl.
CPC .......... *G06F 3/1454* (2013.01); *G05B 19/418* (2013.01); *G06F 3/147* (2013.01); *G06N 3/04* (2013.01); *G06N 20/00* (2019.01); *G09G 5/14* (2013.01); *G09G 2370/20* (2013.01); *G09G 2370/22* (2013.01)

(58) Field of Classification Search
CPC ......... G06F 3/1454; G06F 3/147; G09G 5/14; G09G 2370/20; G09G 2370/022; G05B 19/418; G05B 19/4185; G05B 19/41865; G05B 19/41875; G05B 23/0286; G05B 23/0294; G05B 2219/31457; G06N 20/00; G06N 3/0445
See application file for complete search history.

(56) References Cited

U.S. PATENT DOCUMENTS

2016/0140771 A1 5/2016 Chang et al.
2017/0345221 A1 11/2017 Chang et al.

FOREIGN PATENT DOCUMENTS

JP 2016100001 A 5/2016

*Primary Examiner* — Michael J Eurice
(74) *Attorney, Agent, or Firm* — Arent Fox LLP

(57) ABSTRACT

To promote appropriate mutual understanding among a plurality of users, an information processing device accepts, as a first instruction, a change instruction for changing a visualization screen that visualizes a model representing preset physical entities, the change instruction including at least one instruction of an index addition instruction, a control change instruction, a display change instruction, and a comment addition instruction. The device displays a visualization screen according to the accepted first instruction on a preset display unit. After the display of the visualization screen corresponding to the first instruction, the device accepts, as a second instruction, at least one instruction of the index addition instruction, the control change instruction, the display change instruction, and the comment addition instruction. When the second instruction has been accepted, the device notifies the fact that the visualization screen has been changed to a preset notification destination.

14 Claims, 7 Drawing Sheets

(51) Int. Cl.
*G06N 20/00* (2019.01)
*G09G 5/14* (2006.01)

INFORMATION PROCESSING DEVICE, INFORMATION PROCESSING METHOD AND STORAGE MEDIUM

CROSS-REFERENCE TO RELATED APPLICATIONS

This application is based upon and claims the benefit of priority of the prior Japanese Patent Application No. 2019-074862, filed on Apr. 10, 2019, the entire contents of which are incorporated herein by reference.

BACKGROUND OF THE INVENTION

Field of the Invention

The present invention relates to an information processing device, an information processing method, and a storage medium.

Description of the Related Art

It is conventionally known to simulate a model representing physical entities on an information processing device and confirm the behavior of a simulated model to check the physical entities indicated by the model.

For example, "Digital Twin" known in the manufacturing industry and the like is a technique for visualizing real world entities (products, facilities, and the like) in a digital (or virtual) world. Using the "Digital Twin" enables users to look down on a manufacturing site or the like as an image, and is expected to be useful in an optimization area of a production plan including many processes such as a production plan simulation.

As an example of the "Digital Twin" technique, Patent Document 1 discloses a visualization method and a system for visualizing 4D data, and also discloses an integrated data file generation method and a related device.

Patent Document 1: Japanese Laid-open Patent Publication No. 2016-100001

There is a case where a plurality of users mutually different in task allocated is required to cooperate with each other in carrying out activities. For example, in the manufacturing industry, a certain user may plan and draft production processes and another user may perform a work for manufacturing components. Further, still another user may perform a work for warehousing and shipping products. In such a case, each user accumulates knowledge in the range of the own allocated work. Therefore, within the range of each work, locally optimizing work improvement can be expected. However, there is a problem that the knowledge remains as tacit knowledge within the range of each work, and deepening mutual understanding is difficult for users who are different in task allocated.

According to the conventional technique, although it is possible to present a model representing each work process and deliverables in such activities, deepening mutual understanding among a plurality of users mutually different in task allocated is difficult.

SUMMARY OF THE INVENTION

The present invention intends to promote mutual understanding among a plurality of users more appropriately.

According to one aspect of the present invention, an information processing device includes a first accepter configured to accept, as a first instruction, a change instruction for changing a visualization screen that visualizes a model representing preset physical entities, the change instruction including at least one instruction of an index addition instruction being an instruction for adding an evaluation index of the model, a control change instruction being an instruction for changing a control condition of the model, a display change instruction being an instruction for changing a display condition of the model, and a comment addition instruction being an instruction for adding a comment, a first display controller configured to display the visualization screen corresponding to the first instruction accepted by the first accepter on a preset display unit, a second accepter configured to accept, after the display of the visualization screen corresponding to the first instruction by the first display controller, as a second instruction, at least one instruction of the index addition instruction, the control change instruction, the display change instruction, and the comment addition instruction, and a notifier configured to notify, when the second instruction has been accepted by the second accepter, the fact that the visualization screen has been changed to a preset notification destination.

DETAILED DESCRIPTION OF THE PREFERRED EMBODIMENTS

Hereinafter, embodiments of the present invention will be described with reference to attached drawings.

First Embodiment

[Details of Information Processing System]

An information processing system according to the present embodiment is a system that is configured to output a visualization screen for visualizing a model representing predetermined physical entities. Hereinafter, this model is referred to as a twin model. In the present embodiment, the twin model is a model representing a series of processes for manufacturing and distributing predetermined commodities in a factory.

Figure 1:
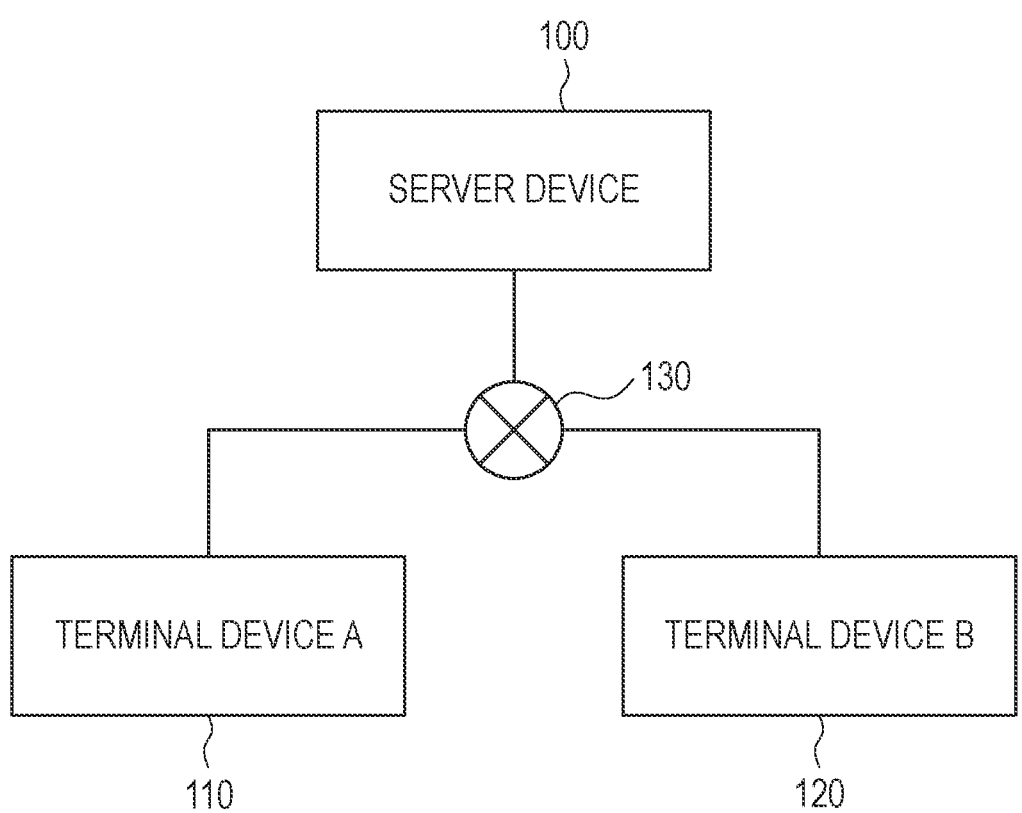
FIG. 1 is a diagram illustrating an exemplary system configuration of an information processing system.

FIG. 1 is a diagram illustrating an exemplary system configuration of the information processing system. The information processing system includes a server device 100, a terminal device A 110, and a terminal device B 120. The server device 100, the terminal device A 110, and the terminal device B 120 are communicably connected to each other via a network 130.

The server device 100 is an information processing device that provides a visualization screen of the twin model to external devices such as the terminal device A 110 and the terminal device B 120. In the present embodiment, the server device 100 is a server device, although it may be another information processing device such as a personal computer, a tablet device, or a computer incorporated in another device.

The terminal device A 110 is an information processing device that presents, to users, visualization screens received from the server device 100. In the present embodiment, the terminal device A 110 is a personal computer, although it may be another information processing device such as a server device, a tablet device, a smartphone, or a personal digital assistant (PDA).

The terminal device B 120 is an information processing device that presents, to users, visualization screens received from the server device 100. In the present embodiment, the terminal device B 120 is a personal computer, although it may be another information processing device such as a server device, a tablet device, a smartphone, or a PDA.

In the present embodiment, the terminal device A 110 and the terminal device B 120 are information processing devices used by users who are different in task allocated. Hereinafter, a user of the terminal device A 110 is referred to as user A. Further, hereinafter, a user of the terminal device B 120 is referred to as user B. The user A and the user B are users engaged in manufacturing and distribution of predetermined commodities and are different from each other in task allocated.

The network 130 is a network, such as the Internet or a local area network (LAN).

[Details of Server Device]

Figure 2:
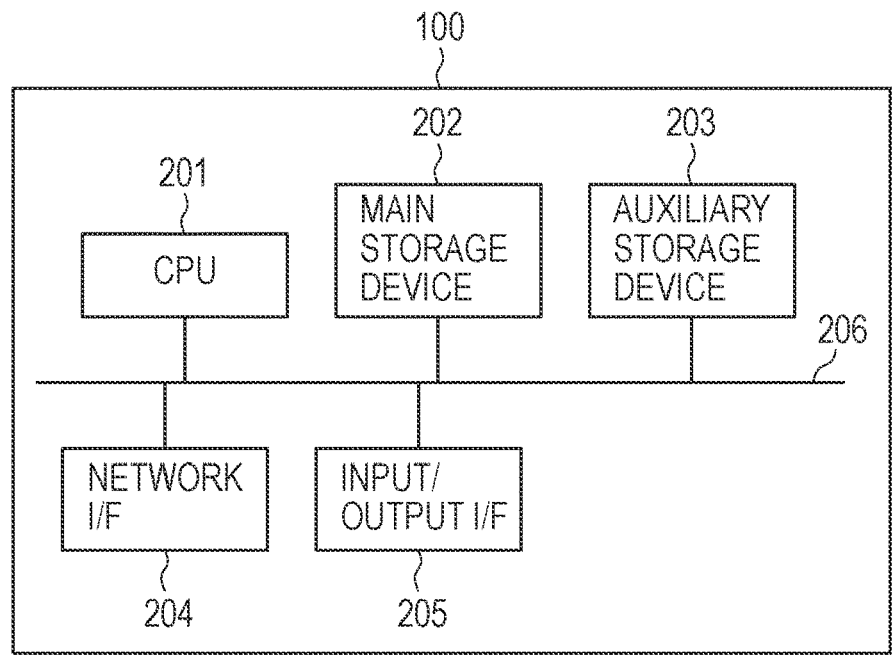
FIG. 2 is a diagram illustrating an exemplary hardware configuration of an information processing device.

FIG. 2 is a diagram illustrating an exemplary hardware configuration of the server device 100.

The server device 100 includes a central processing unit (CPU) 201, a main storage device 202, an auxiliary storage device 203, a network I/F 204, an input/output I/F 205. Respective components are communicably connected to each other via a system bus 206.

The CPU 201 is a central processing unit that controls the server device 100. The main storage device 202 is a storage device such as a random access memory (RAM) that functions as a work area of the CPU 201, a temporary storage area for data, or the like.

The auxiliary storage device 203 is a storage device that stores various programs, various kinds of setting information, twin model information, and the like. The auxiliary storage device 203 is a read only memory (ROM), a hard disk drive (HDD), a solid state drive (SSD), a flash memory, or the like.

The network I/F 204 is an interface usable in communications via the network 130 with external devices such as the terminal device A 110 and the terminal device B 120. The input/output I/F 205 is an interface usable in connection with input devices including a mouse, a keyboard, and a touch panel and output devices including a monitor, a display unit of the touch panel, and a hologram display device.

The CPU 201, when executing processing according to programs stored in the auxiliary storage device 203, can realize functions of the server device 100 described in detail below with reference to FIG. 3, processing of a flowchart illustrated in FIG. 5, and the like.

Figure 3:
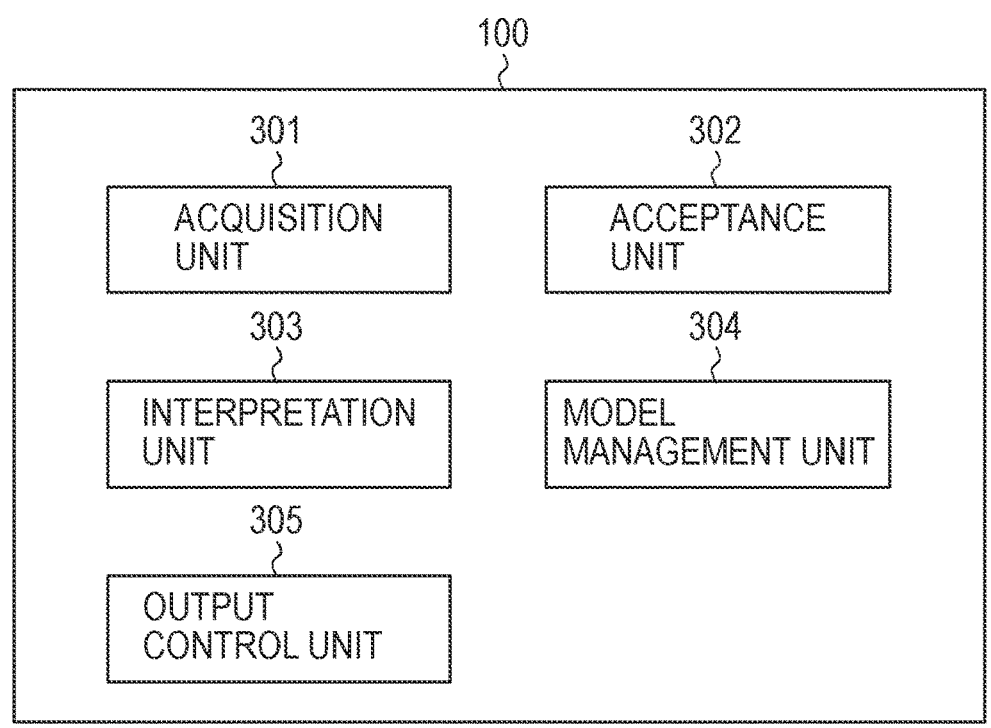
FIG. 3 is a diagram illustrating an exemplary functional configuration of the information processing device.

FIG. 3 is a diagram illustrating an exemplary functional configuration of the server device 100.

The server device 100 includes an acquisition unit 301, an acceptance unit 302, an interpretation unit 303, a model management unit 304, and an output control unit 305.

The acquisition unit 301 acquires raw data that is information indicating when, where, and what was actually processed, transported, and arranged and the like in each facility represented by the twin model. Further, the acquisition unit 301 acquires spatiotemporal definition information indicating the definition of facilities (e.g., a commodity processing facility, and commodity storage spaces) indicated by the twin model and the period of simulation.

The acceptance unit 302 accepts information indicating an instruction for changing the visualization screen of the twin model (hereinafter, referred to as interpretation information) from the terminal device A 110, the terminal device B 120, or the like.

The interpretation information includes an index addition instruction being an instruction for adding an evaluation index of the twin model displayed on the visualization screen, a control change instruction being an instruction for changing a control condition of the twin model visualized on the visualization screen (a condition indicating how the twin model behaves in the simulation), a display change instruction being an instruction for changing a display condition of the twin model displayed on the visualization screen, and a comment addition instruction being an instruction for adding a comment to the visualization screen.

The interpretation unit 303 generates a twin model based on the raw data acquired by the acquisition unit 301 and the spatiotemporal definition information. Further, the interpretation unit 303 determines generation conditions, which are conditions relating to generation of the visualization screen of the twin model, based on the interpretation information accepted by the acceptance unit 302. In the present embodiment, the generation conditions are predetermined initial values and are stored in advance in the auxiliary storage device 203.

The generation conditions indicate what kind of index is used as a twin model evaluation index, how the twin model behaves, how the twin model is displayed, and what kind of comment is displayed together with the twin model, or the like.

The model management unit 304 stores, in the auxiliary storage device 203, the conditions for generating the twin model and the visualization screen of the twin model, and manages the stored conditions.

The output control unit 305 generates the visualization screen of the twin model based on the generation conditions and performs a control for outputting the generated visualization screen.

[Details of Terminal Device]

Figure 4:
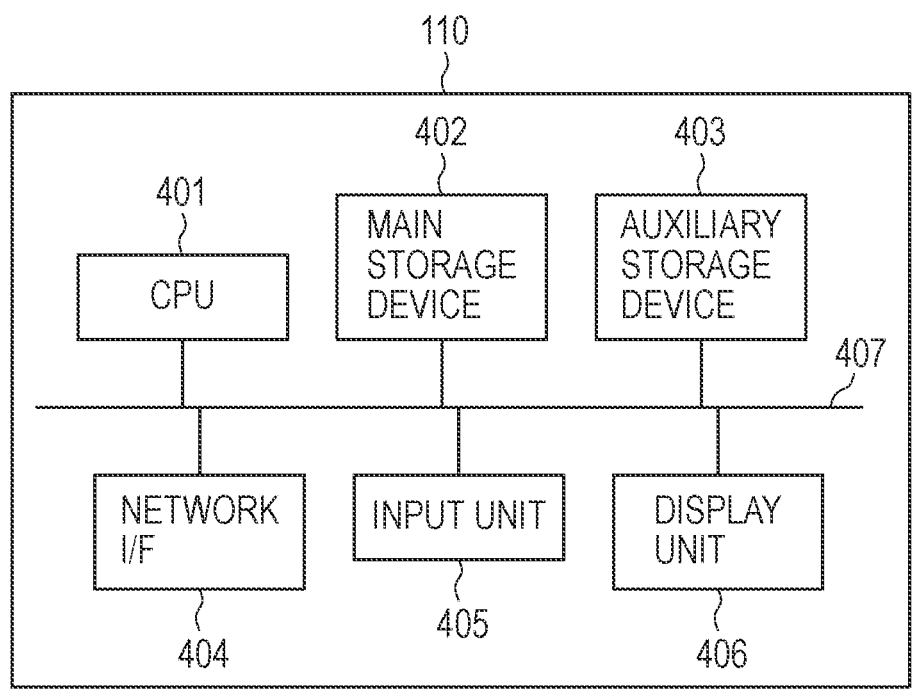
FIG. 4 is a diagram illustrating an exemplary hardware configuration of a terminal device.

FIG. 4 is a diagram illustrating an exemplary hardware configuration of the terminal device A 110.

The terminal device A 110 includes a CPU 401, a main storage device 402, an auxiliary storage device 403, a network I/F 404, an input unit 405, and a display unit 406.

The CPU 401 is a central processing unit that controls the terminal device A 110. The main storage device 402 is a storage device such as a RAM that functions as a work area of the CPU 401, a temporary storage area for data, or the like.

The auxiliary storage device 403 is a storage device such as a ROM, a HDD, an SSD, or a flash memory that stores various programs and various kinds of setting information.

The network I/F 404 is an interface usable in communications, via the network 130, with external devices including the server device 100. The input unit 405 is an input device such as a mouse, a keyboard, or a touch panel. The display unit 406 is a display device such as a monitor, a display unit of the touch panel, or a hologram output device.

The CPU 401, when executing processing according to programs stored in the auxiliary storage device 403, can realize functions of the terminal device A 110, processing of the terminal device A 110 and the like.

In the present embodiment, the terminal device B 120 has a hardware configuration similar to the hardware configuration of the terminal device A 110 illustrated in FIG. 4.

The CPU of the terminal device B 120, when executing processing according to programs stored in an auxiliary storage device of the terminal device B 120, can realize functions of the terminal device B 120, processing of the terminal device B 120, and the like.

[Details of Processing by Information Processing System]

Figure 5:
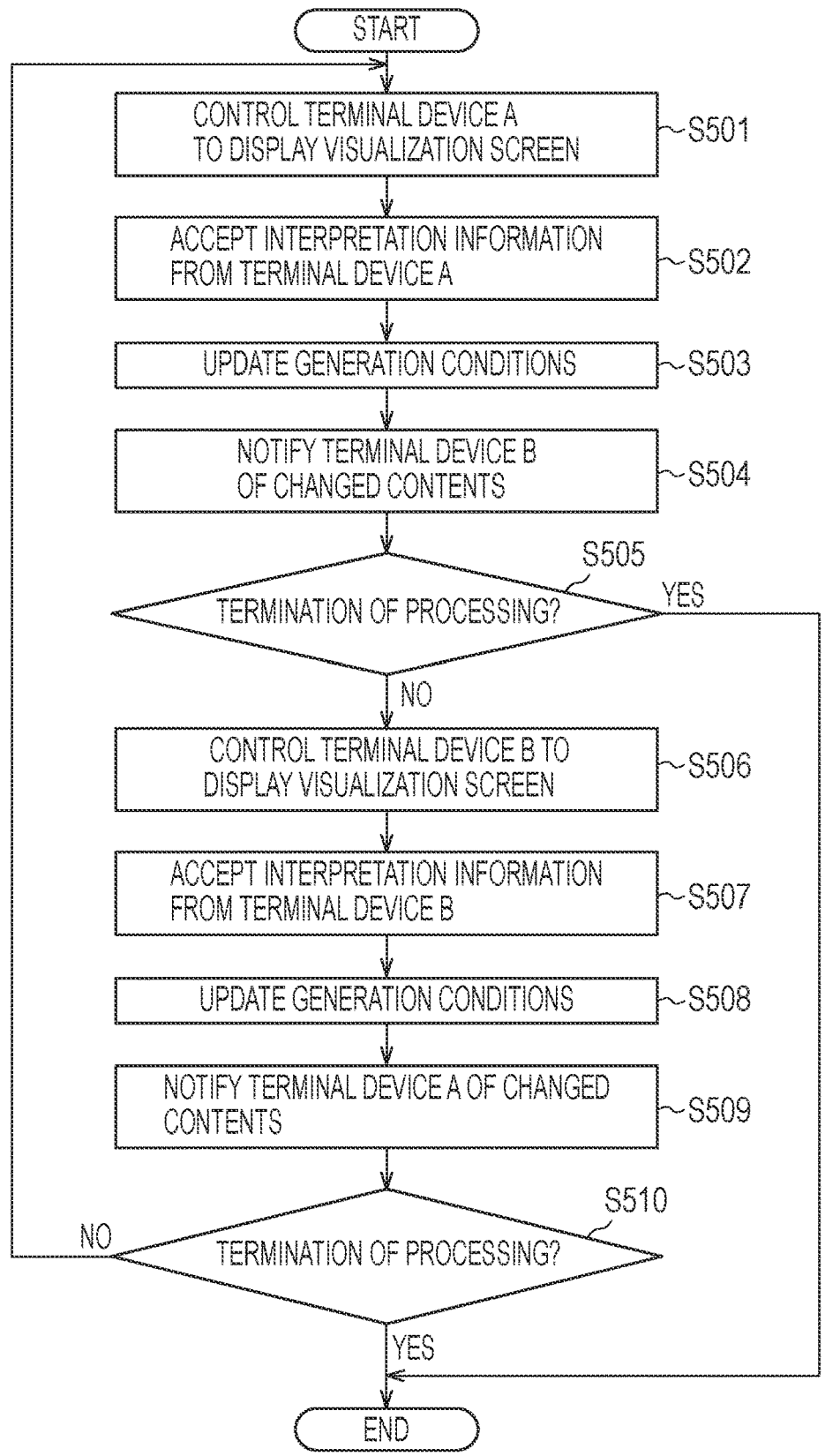
FIG. 5 is a flowchart illustrating exemplary processing that can be performed by the information processing device.

FIG. 5 is a diagram illustrating exemplary processing that can be performed by the server device 100 according to the present embodiment.

The server device 100 performs the following pre-processing before starting the processing illustrated in FIG. 5. That is, the acquisition unit 301 acquires spatiotemporal definition information. In the present embodiment, the acquisition unit 301 is configured to acquire the spatiotemporal definition information based on an operation via the input device connected to the input/output I/F 205. However, as another example, when the auxiliary storage device 203 stores spatiotemporal definition information in advance, the acquisition unit 301 may be configured to acquire the spatiotemporal definition information from the auxiliary storage device 203. Further, the acquisition unit 301 may be configured to acquire spatiotemporal definition information from an external device such as the terminal device A 110 and the terminal device B 120.

Further, the acquisition unit 301 acquires raw data. In the present embodiment, the acquisition unit 301 is configured to acquire the raw data based on an operation via the input device connected to the input/output I/F 205. However, as another example, when the auxiliary storage device 203 stores raw data in advance, the acquisition unit 301 may be configured to acquire the raw data from the auxiliary storage device 203. Further, the acquisition unit 301 may be configured to acquire the raw data from an external device such as the terminal device A 110 and the terminal device B 120.

The interpretation unit 303 determines, based on the spatiotemporal definition information and the raw data, a twin model and initial values of the generation conditions for the visualization screen of the twin model. In the present embodiment, the acquisition unit 301 is configured to determine, as the initial values of the generation conditions, conditions indicating that the twin model behaves as indicated by the raw data within the period indicated by spatiotemporal definition information.

The model management unit 304 stores the twin model and the generation conditions in the auxiliary storage device 203.

The above processing is the pre-processing to be executed prior to the processing illustrated in FIG. 5. Hereinafter, the processing illustrated in FIG. 5 will be described.

In step S501, the output control unit 305 generates a visualization screen, in response to a visualization screen request from the terminal device A 110, based on the twin model and the generation conditions stored in the auxiliary storage device 203.

At the time of first processing in step S501, the generation conditions are initial generation conditions and are conditions indicating that the twin model behaves as indicated by the raw data within the period indicated by the spatiotemporal definition information. In the present embodiment, in the first processing in step S501, the output control unit 305 creates a moving image of the twin model that behaves as indicated by the raw data within the period indicated by the spatiotemporal definition information, and generates a visualization screen including the created moving image.

Figure 6:
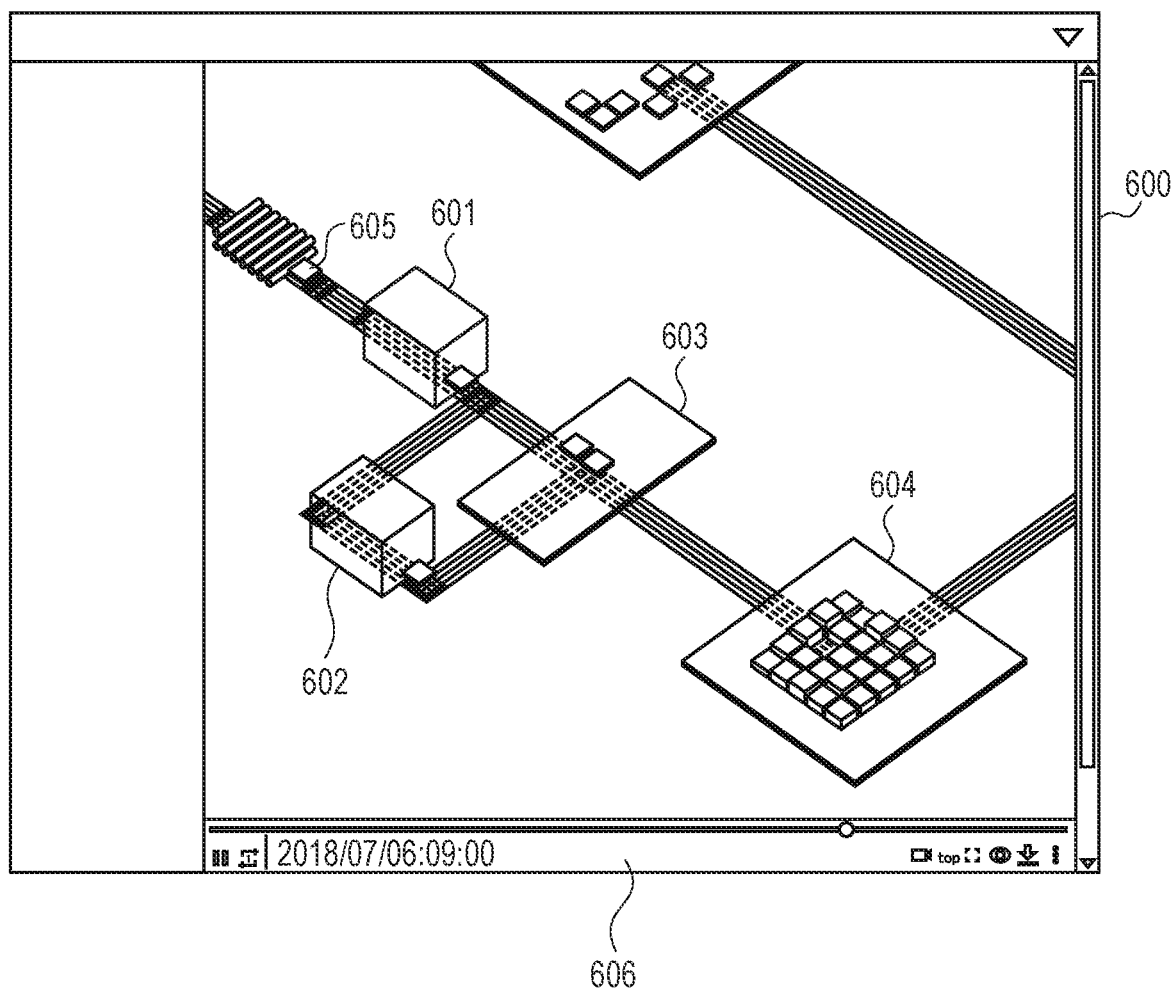
FIG. 6 is a diagram illustrating an exemplary visualization screen.

FIG. 6 is a diagram illustrating an exemplary visualization screen generated in step S501.

According to the example illustrated in FIG. 6, a visualization screen 600 includes a moving image indicating a state in which commodities are processed and distributed between respective facilities indicated by the twin model. The moving image included in the visualization screen indicates a state where commodities processed in processing facilities 601 and 602 are conveyed to a storage space 603, and then conveyed to a storage space 604, and is further conveyed to subsequent processes. A seek bar 606 indicates the time in this moving image. A knob of the seek bar 606 moves along with the play of the moving image.

Then, the output control unit 305 transmits the generated visualization screen to the terminal device A 110, and controls the display unit 406 to display the visualization screen. This control processing is an example of display control processing.

The user A can grasp physical entities indicated by the twin model by viewing the visualization screen displayed on the display unit 406. The user A, who has grasped the twin model behavior, examines what kind of improvement can be made to the physical entities indicated by the twin model, what kind of evaluation index can be considered, what kind of display form for the twin model is suitable in easily grasping the contents, or the line, and obtains an interpretation unique to the user A.

Then, so as to reflect the obtained interpretation, the user A may request, for the visualization screen, adding a twin model evaluation index, changing twin model control conditions, changing twin model display conditions, and adding a comment to the visualization screen.

In step S502, the acceptance unit 302 accepts interpretation information based on an operation via the input unit 405 by the user A who has confirmed the simulation screen displayed in step S501.

In step S503, the interpretation unit 303 updates the generation conditions by registering the interpretation information accepted in step S502 to the generation conditions.

In step S504, the interpretation unit 303 notifies a preset notification destination (in the present embodiment, the terminal device B 120) of the fact that the visualization screen has been changed. Further, the interpretation unit 303 notifies the terminal device B 120 of information indicating what kind of difference has occurred on the visualization screen before and after the update of the generation conditions. Further, in accordance with the update of the generation conditions, when the difference having occurred on the visualization screen is a change in the value of the preset evaluation index related to the twin model, and if the changed value of the evaluation index is a value outside a predetermined allowable range, the interpretation unit 303 further notifies the terminal device B 120 of warning information.

The visualization screen change notification in step S504 enables the user B of the terminal device B 120 to grasp the change added to the visualization screen. Then, the user B transmits a visualization screen request, via the terminal device B 120, to the server device 100.

In step S505, the interpretation unit 303 determines whether a processing termination instruction has been accepted. In the present embodiment, the interpretation unit 303 is configured to accept the processing termination instruction based on an operation on the input device connected to the input/output I/F 205. However, as another example, the interpretation unit 303 may accept the processing termination instruction from an external device such as the terminal device A 110, the terminal device B 120, or the like.

The interpretation unit 303, when determining that the processing termination instruction has been accepted, terminates the processing illustrated in FIG. 5. On the other hand, if it is determined that the processing termination instruction has not been accepted, the processing proceeds to step S506.

In step S506, the output control unit 305 generates a visualization screen, in response to the visualization screen request from the terminal device B 120, based on the generation conditions updated in step S503.

Then, the output control unit 305 transmits the generated visualization screen to the terminal device B 120 and controls the display unit of the terminal device B 120 to display the visualization screen. This control processing is an example of display control processing.

The visualization screen displayed in step S506 is a visualization screen generated based on the generation conditions updated in step S503 so as to reflect the interpretation of the user A. The user B, by viewing this visualization screen, can grasp the physical entities indicated by the twin model in consideration of the interpretation of the user A. The user B, while confirming this visualization screen, examines what kind of improvement can be made to the physical entities indicated by the twin model, what kind of evaluation index can be considered, what kind of display form for the twin model is suitable in easily grasping the contents, or the like, and obtains an interpretation unique to the user B.

Then, so as to reflect the obtained interpretation, the user B may request, for the visualization screen, adding a twin model evaluation index, changing twin model control conditions, changing twin model display conditions, and adding a comment to the visualization screen.

Figure 7:
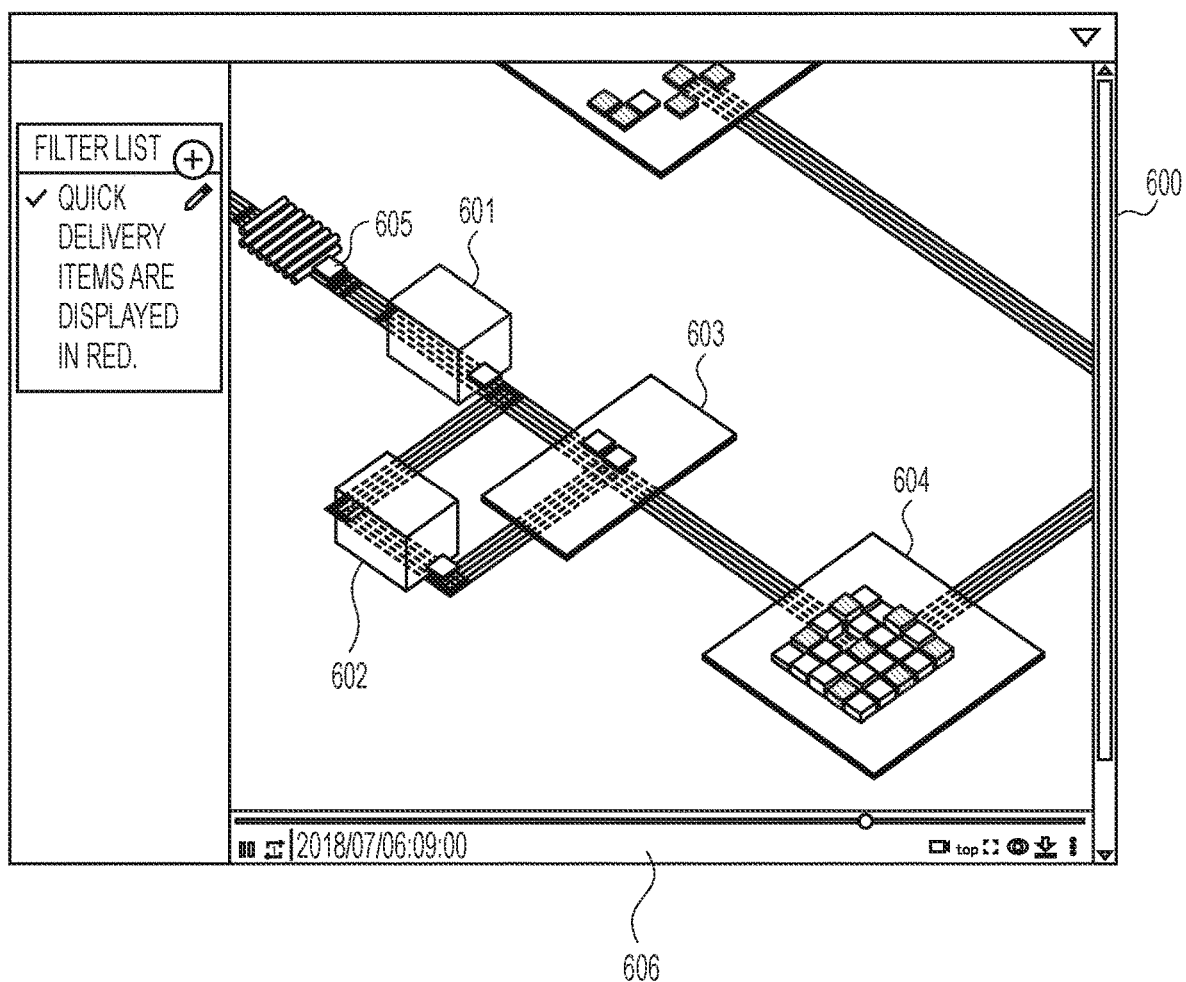
FIG. 7 is a diagram illustrating an exemplary visualization screen.

FIG. 7 is a diagram illustrating an exemplary visualization screen displayed in step S506.

According to the example illustrated in FIG. 7, it is assumed that the visualization screen 600 illustrated in FIG. 6 has been displayed in the preceding step S501. Further, it is assumed that the interpretation information accepted in the preceding step S502 includes an instruction for changing the display color to a designated color for a designated kind of commodities, among commodities to be processed and distributed. Here, it is assumed that the designated kind of commodities are commodities that are requested to be shipped earlier than other commodities (hereinafter, refer to quick delivery items). Further, it is assumed that the designated color is red. Therefore, in a moving image included in the visualization screen 600 illustrated in FIG. 7, the quick delivery items are displayed in red among commodities 605 transported between respective facilities of the processing facility 601, the processing facility 602, the storage space 603, the storage space 604, and the like. Further, the remaining commodities 605 are displayed in a predetermined color (e.g., white, blue, or the like) different from red. In FIG. 7, the quick delivery items are illustrated as diagonally shaded commodities and the remaining commodities 605 are illustrated as non-shaded commodities. The same applies to FIG. 8 described below.

By confirming such a moving image, the user B can grasp a transportation status of the quick delivery items among all the commodities, and can obtain an interpretation unique to the user B, in consideration of the transportation status of the quick delivery items.

In step S507, the acceptance unit 302 accepts interpretation information based on an operation on the input unit of the terminal device B 120 by the user B who has confirmed the visualization screen displayed according to the instruction in step S506.

In step S508, the interpretation unit 303 updates the generation conditions by registering the interpretation information accepted in step S507 to the generation conditions.

In step S509, the interpretation unit 303 notifies a preset notification destination (in the present embodiment, the terminal device A 110) of the fact that the visualization screen has been changed. Further, the interpretation unit 303 notifies the terminal device A 110 of information indicating what kind of difference has occurred on the visualization screen before and after the update of the generation conditions. Further, in accordance with the update of the generation conditions, when the difference having occurred on the visualization screen is a change in the value of the preset evaluation index related to the twin model, and if the changed value of the evaluation index is a value outside a predetermined allowable range, the interpretation unit 303 further notifies the terminal device A 110 of warning information.

The visualization screen change notification in step S509 enables the user A of the terminal device A 110 to grasp the change added to the visualization screen. Then, the user A transmits a visualization screen request, via the terminal device A 110, to the server device 100.

In step S510, the interpretation unit 303 determines whether the processing termination instruction has been accepted. The interpretation unit 303, when determining that the processing termination instruction has been accepted, terminates the processing illustrated in FIG. 5. If it is determined that the processing termination instruction has not been accepted, the processing proceeds to step S501.

When it is determined in step S510 that the processing termination instruction has not been accepted, the output control unit 305 performs the following processing in step S501. That is, the output control unit 305 generates a visualization screen, in response to the visualization screen request from the terminal device A 110, based on the generation conditions updated in step S508, and causes a display unit 460 of the terminal device A 110 to display the generated screen.

Figure 8:
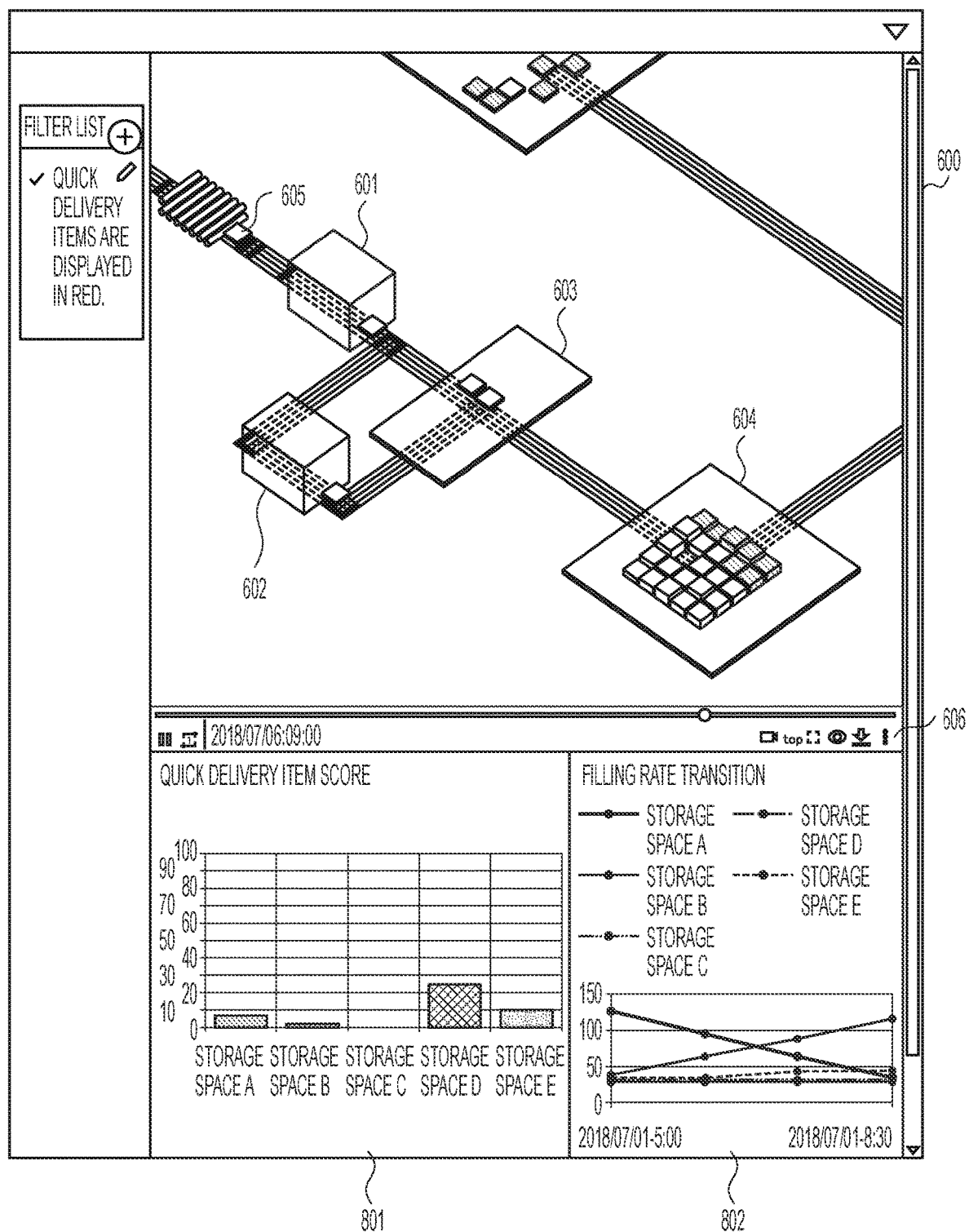
FIG. 8 is a diagram illustrating an exemplary visualization screen.

FIG. 8 is a diagram illustrating an exemplary visualization screen to be generated and displayed in step S501 when it is determined in step S510 that the processing termination instruction has not been accepted.

According to the example illustrated in FIG. 8, it is assumed that the visualization screen 600 illustrated in FIG. 7 has been displayed in the preceding step S506.

Further, it is assumed that the user B has obtained an interpretation that the quick delivery items can be transported more efficiently if the quick delivery items and the remaining commodities are separately arranged in the storage space 604. Further, it is assumed that the interpretation information from the user B in the preceding step S507 includes an instruction for changing the twin model control conditions so as to separately arrange the quick delivery items and the remaining commodities in the storage space 604, an instruction for adding a quick delivery item score being an index for evaluating the number of the quick delivery items existing in each storage space at each point of time, and an instruction for adding a filling rate transition being an index for evaluating the transition in filling rate of the commodities in each storage space.

Therefore, in the moving image included in the visualization screen 600 illustrated in FIG. 8, the commodities 605 arranged in the storage space 604 is separately arranged for the quick delivery items and the remaining commodities. Further, quick delivery item score information indicating the number of quick delivery items existing in each storage space at the moment indicated by the knob of the seek bar 606 is displayed in an area 801 of the visualization screen 600. Further, filling rate transition information indicating the transition in filling rate of each storage space is displayed in an area 802 of the visualization screen 600.

The user A, by visually recognizing the visualization screen 600 illustrated in FIG. 8, obtains an interpretation unique to the user A about the twin model in consideration of the interpretation of the user B.

Effects

As mentioned above, in the present embodiment, the information processing system accepts interpretation information from a user, causes the preset display unit to display a visualization screen corresponding to the interpretation information, and further accepts interpretation information from another user who has visually recognized the displayed visualization screen. In addition, the information processing system notifies the former user of the fact that the interpretation information has been accepted from the latter user. As a result, the information processing system promotes the former user to confirm the visualization screen on which the interpretation by the latter user is reflected. The former user can further deepen the understanding of the physical entities expressed by the twin model, in consideration of the interpretation by the latter user. That is, the information processing system can promote mutual understanding among a plurality of users more appropriately.

Further, the information processing system can generate and display a visualization screen cumulatively reflecting respective interpretations of different users by repeating processing of accepting the interpretation information and updating the generation conditions. Each of a plurality of users mutually different in task allocated can deepen mutual understanding by confirming such a visualization screen. As a result, improvement in a series of processes for producing and distributing commodities can be promoted.

Modified Example 1

In the above-described embodiment, the server device 100 is connected to two terminal devices. However, the server device 100 may be connected to three or more terminal devices. For example, when there are three or more users who are mutually different in task allocated and use mutually different terminal devices, the server device 100 may be connected to each of the terminal devices used by these users.

In such a case, in each of step S501 and step S506, the server device 100 causes a display unit of the terminal device having generated the visualization screen request, among a plurality of terminal devices, to display the visualization screen. Then, in each of step S502 and step S507, the server device 100 accepts interpretation information via an input unit of the terminal device having generated the visualization screen request. In addition, in each of step S504 and step S509, the server device 100 notifies all the terminal devices other than the terminal device having generated the visualization screen request.

Modified Example 2

In the above-described embodiment, the server device 100 displays a visualization screen on an external terminal device and accepts interpretation information from the external terminal device. However, as another example, the server device 100 may be configured to display visualization screen on a display device connected to the input/output I/F 205 and accept interpretation information via an input device connected to the input/output I/F 205.

In such a case, in each of step S501 and step S506, the server device 100 causes the display device connected to the input/output I/F 205 to display the visualization screen. Then, in each of step S502 and step S507, the server device 100 accepts the interpretation information via the input device connected to the input/output I/F 205. Further, in each of step S504 and step S509, the server device 100 causes the display device connected via the input/output I/F 205 to display information indicating a notification.

For example, there are cases in which a plurality of users mutually different in task allocated confirms a visualization screen on one monitor at the same place and desires to input interpretation information. In such a case, the server device 100 according to this modified example can cope with the situation.

Modified Example 3

In the above-described embodiment, when the generation conditions have been updated in steps S503 and S508, the server device 100 displays a visualization screen corresponding to post-update generation conditions in steps S506 and S501. However, the server device 100 may be configured to display a visualization screen corresponding to pre-update generation conditions in steps S506 and S501 together with the visualization screen corresponding to the post-update generation conditions.

Users can easily grasp changed contents by comparing the visualization screen according to the post-update generation conditions with the visualization screen according to the pre-update generation conditions.

Modified Example 4

In the above-described embodiment, the twin model is a model that represents a series of processes for manufacturing and distributing commodities in a factory. However, as another example, the twin model may be another model. For example, the twin model may be a model representing a series of processes allocated to a livestock farmer, a food processor, a distributor, and a restaurant in the manufacturing and distribution of, for example, food (e.g., ham). As a result, mutual understanding can be promoted among business persons mutually different in task allocated (for example, among business persons belonging to different industries in a supply chain), and the improvement in production can be attained.

Further, the twin model may be a model representing commodities such as a motor, an engine, a vehicle, and the like.

Hereinafter, exemplary embodiments to which the information processing system according to the present embodiment can be applied will be described.

Exemplary Embodiment 1

It is assumed that a worker in a downstream process has changed production contents from an initial plan in accordance with a change in the flow rate and properties of products coming from an upstream process. This embodiment is a use case in which the worker in the upstream process and the worker in the downstream process look back and examine improvements in production, after this. In this embodiment, it is assumed that the worker in the downstream process is user A and the worker in the upstream process is user B.

The information processing system acquires raw data of the initial plan and production results changed from the initial plan, generates a visualization screen of the twin model, and displays the generated visualization screen on the display unit 460 of the terminal device A 110. The information processing system may generate and display the visualization screen so as to clearly indicate a spatiotemporal point where the production contents have been changed from the initial plan.

The information processing system accepts, from the user A, as interpretation information (1), an instruction for adding a twin model evaluation index, which is an evaluation index capable of evaluating the influence of changed production contents, and updates generation conditions for the visualization screen. The interpretation information (1) is information reflecting a local interpretation relating to the downstream process, which is the range of a task that the user A takes charge of. As a result, hereafter, the information processing system displays information of this evaluation index on the visualization screen.

Subsequently, the information processing system notifies the terminal device B 120 of the fact that the visualization screen has been changed. Further, the information processing system may be configured to accept, from the user A, a designation of the product on the screen that has caused the user A to change the production contents, and notify the accepted designation of the product to the terminal device having been involved in the production of this product in the upstream process. Further, the information processing system may cause the display unit of the terminal device B 120 to display a visualization screen that clearly indicates a spatiotemporal point where the product has been present in the task range that the user B takes charge of. Further, the information processing system may add, to the information to be notified to the terminal device B 120, at least one of information on the user who has input the index addition instruction, the instruction input time, information on the spatiotemporal point relating to the instruction, and the like.

The information processing system accepts interpretation information (2) from the user B and notifies the terminal device A 110 of the fact that the visualization screen has been updated.

Hereafter, the information processing system displays a visualization screen generated based on the generation conditions changed according to the interpretation information (2) and the interpretation information (1). That is, the interpretation information (1) and the interpretation information (2) are linked with each other via the visualization screen.

When examining the improvement in production, the user changes (by trial and error) the twin model control conditions. The user, by confirming the visualization screen reflecting the interpretation information from another user different in task allocated, can more appropriately grasp the influence of each production change on other processes.

In addition, when holding the linked interpretation information in a graph structure, the information processing system can speedily search for related interpretation information. Further, the information processing system may set, for each user, a range in which addition and editing of the interpretation information can be accepted, according to the task range that each user takes charge of. For example, the information processing system may limit the interpretation information acceptable from the user A (or the terminal device A 110 that the user A uses) to only the interpretation information whose type relates to the task range of the user A.

Exemplary Embodiment 2

This embodiment is a use case in which there is a gap between two plans, e.g., a production plan considered to be optimum by a person (the user A) in charge of quality management and a production plan considered to be optimum by a person (the user B) in charge of production management.

In the quality management, if "the creation is careful so as to improve the quality", the quality management evaluation index value becomes better. To the contrary, in the production management, if "the creation is quick so as to improve the productivity", the production management evaluation index value becomes better.

For example, in a certain process $\alpha$, if device settings are changed based on the production management evaluation index, the quality management evaluation index may be worsened in another process $\beta$.

The information processing system acquires raw data of the production plan considered to be optimum by the user A and the production plan considered to be optimum by the user B, and generates visualization screens of the twin model. The information processing system may be configured, in such a case, to highlight (e.g., display in a predetermined color, display by blinking, or the like) at least one of spatiotemporal points (e.g., a certain facility at a certain point of time) where a gap occurs between twin models according to two plans. More specifically, the information processing system may be configured, when accepting a control condition change instruction, to highlight a spatiotemporal point where a gap occurs between the twin model behavior before the change in control conditions and the twin model behavior after the change in control conditions. Further, the information processing system may be configured, when accepting the control condition change instruction, to highlight a spatiotemporal point where a gap occurs between the twin model according to the accepted control conditions and the twin model according to the previously accepted control conditions.

The information processing system accepts, from the user A, as the interpretation information (1), an instruction for adding a twin model evaluation index, which is an evaluation index capable of evaluating the influence of changed production contents, and updates the generation conditions for the visualization screen. As a result, hereafter, the information processing system displays information of this evaluation index on the visualization screen.

Subsequently, the information processing system notifies the terminal device B 120 of the fact that the visualization screen has been changed.

The information processing system accepts, from the user B, the interpretation information (2) indicating the instruction for changing the twin model control conditions and interpretation information (3) indicating an evaluation index addition instruction. Then, the information processing system, via the visualization screen, enables the user A to grasp the evaluation index value indicated by the interpretation information (1) and the interpretation information (3), in the twin model controlled based on the control conditions indicated by the interpretation information (2).

When detecting processes A, B, C, D, . . . each causing a gap between respective models derived from plans created by a plurality of departments in charge, the information processing system enables each department in charge to designate bottleneck processes. For example, for the process B, the system prioritizes the interpretation information (1) over others. And, for the process D, the system prioritizes the interpretation information (3) over others. Thus, the generation conditions can be updated so as to reflect higher-order interpretations. For example, the information processing system uses the evaluation index of the interpretation information (1) for the location (e.g., facility) of the twin model corresponding to the process B, and uses the evaluation index of the interpretation information (3) for the location of the twin model corresponding to the process D.

The information processing system may perform priority settings for the interpretation information by causing the twin model to fluctuate according to a predetermined method to detect the relevance (correlation, batting, etc.) of the linked and registered interpretation information, and displaying a resulting visualization screen. Further, the information processing system may be configured to use the priority having been set for the interpretation information in a process of weighting each piece of interpretation information, in addition to the process of prioritizing one of a plurality of interpretations over the rest.

Exemplary Embodiment 3

This embodiment is a use case in which there is a gap between a production plan drafted by a data scientist and an actual production result by a field worker.

Based on a gap between a model based on the production plan and a model based on the actual production result, a field worker (user A) registers interpretation information. A visualization screen subsequently displayed promotes the understanding of the site by the data scientist.

The data scientist (user B) confirms the visualization screen according to the interpretation information registered by the field worker, and drafts a new production plan. The data scientist registers interpretation information indicating each change to twin model control conditions according to the drafted production plan. A visualization screen subsequently displayed promotes the understanding of an analysis model by the field worker.

Conventionally, relying only on production plans or actual production results has hindered the mutual understanding between users. However, the information processing system described above can support the mutual understanding between users by displaying the visualization screen that cumulatively reflect the interpretation information, and can improve operations step by step.

Exemplary Embodiment 4

This embodiment is a use case in which there is a gap between an actual production result by an experienced (or skilled) worker and an actual production result by a newcomer worker.

In step S503, the experienced worker (user A) registers, for a spatiotemporal point having caused a gap between actual production results, interpretation information indicating an additional instruction of an annotation information comment about own knowledge (for example, "Today, unlike an ordinary way, I have done it in this manner, because . . . -", or the like).

Then, in step S506, a visualization screen including the comment information from the user A is displayed on the display unit of the terminal device B 120. The newcomer worker (user B) can grasp the intent of the experienced worker by confirming this screen.

As a result, the information processing system can facilitate transmission of knowledge from the experienced worker to the newcomer worker. Further, as a result, the information processing system can easily transfer the skills of the experienced worker as digital data to the newcomer worker.

OTHER EMBODIMENTS

In the first embodiment, the server device 100 is a single information processing device. However, the server device 100 may be configured as a system including a plurality of information processing devices communicably connected to each other via a network (LAN or Internet). In such a case, CPUs of respective information processing devices included in the server device 100 cooperatively execute processing based on programs stored in auxiliary storage devices of respective information processing devices, thereby realizing the functions illustrated in FIG. 3 and the processing of the flowchart illustrated in FIG. 5.

Although some examples of the embodiments of the present invention have been described in detail, the present invention is not limited to specific embodiments.

For example, a part or the whole of the above-described functional configuration of the server device 100 may be implemented as hardware incorporated in the server device 100. Further, each modified example may be arbitrarily combined with the above-described first embodiment.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The embodiments ensures promotion of mutual understanding among a plurality of users more appropriately.

What is claimed is:

1. An information processing device comprising:
a first accepter configured to accept, as a first instruction, a change instruction for changing a visualization screen that visualizes a model representing preset physical entities, the change instruction including at least one instruction of an index addition instruction being an instruction for adding an evaluation index of the model, a control change instruction being an instruction for changing a control condition of the model, a display change instruction being an instruction for changing a display condition of the model, and a comment addition instruction being an instruction for adding a comment;
a first display controller configured to display the visualization screen corresponding to the first instruction accepted by the first accepter on a preset display unit;
a second accepter configured to accept, after the display of the visualization screen corresponding to the first instruction by the first display controller, as a second instruction, at least one instruction of the index addition instruction, the control change instruction, the display change instruction, and the comment addition instruction; and a notifier configured to notify, when the second instruction has been accepted by the second accepter, a fact that the visualization screen has been changed to a preset notification destination, wherein the first display controller displays the visualization screen including information of an index indicated by the index addition instruction when the first instruction accepted by the first accepter includes the index addition instruction, displays the visualization screen including information of the model controlled corresponding to the control change instruction when the first instruction includes the control change instruction, displays the visualization screen including information of the model displayed under a display condition corresponding to the display change instruction when the first instruction includes the display change instruction, and displays the visualization screen including information of a comment indicated by the comment addition instruction when the first instruction includes the comment addition instruction.

2. The information processing device according to claim 1, wherein when the second instruction has been accepted by the second accepter, the notifier further notifies the notification destination of information indicating a difference between the visualization screen corresponding to the first instruction and a visualization screen corresponding to the first and second instructions.

3. The information processing device according to claim 1, wherein the physical entities are a series of production and distribution processes for preset commodities.

4. The information processing device according to claim 1, further comprising a controller configured to control the visualization screen so as to include information on a gap between a plurality of models corresponding to a respective plurality of respective different control conditions.

5. The information processing device according to claim 1, further comprising a priority setter configured to set, for each location relating to a gap between a plurality of models corresponding to a respective plurality of respective different control conditions, a priority of each accepted change instruction applied to the visualization screen.

6. The information processing device according to claim 1, wherein the notifier further notifies the notification destination of at least one of information on a user who has input the second instruction, instruction time, information on a spatiotemporal point relating to the instruction.

7. The information processing device according to claim 1, further comprising a setter configured to set, for each user, an acceptable range of the change instruction to the visualization screen.

8. The information processing device according to claim 1, wherein when the second instruction has been accepted by the second accepter, if a difference between the visualization screen corresponding to the first instruction and a visualization screen corresponding to the first and second instructions satisfies a predetermined condition, the notifier further notifies the notification destination of information indicating warning.

9. The information processing device according to claim 8, wherein the predetermined condition is a condition indicating that a value of a preset evaluation index related to the model has changed to a value outside an allowable range.

10. The information processing device according to claim 1, further comprising a second display controller configured to display, after the notification by the notifier, the visualization screen corresponding to the first instruction accepted by the first accepter and the second instruction accepted by the second accepter, on a preset display unit.

11. The information processing device according to claim 10, wherein the second display controller displays the visualization screen including information of an index indicated by the index addition instruction when the first instruction accepted by the first accepter or the second instruction accepted by the second accepter includes the index addition instruction, displays the visualization screen including information of the model controlled corresponding to the control change instruction when the first instruction or the second instruction includes the control change instruction, displays the visualization screen including information of the model displayed under a display condition corresponding to the display change instruction when the first instruction or the second instruction includes the display change instruction, and displays the visualization screen including information of a comment indicated by the comment addition instruction when the first instruction or the second instruction includes the comment addition instruction.

12. The information processing device according to claim 10, wherein the second display controller further displays the visualization screen corresponding to the first instruction, in addition to the visualization screen corresponding to the first instruction accepted by the first accepter and the second instruction accepted by the second accepter.

13. An information processing method comprising:

accepting, as a first instruction, a change instruction for changing a visualization screen that visualizes a model representing preset physical entities, the change instruction including at least one instruction of an index addition instruction being an instruction for adding an evaluation index of the model, a control change instruction being an instruction for changing a control condition of the model, a display change instruction being an instruction for changing a display condition of the model, and a comment addition instruction being an instruction for adding a comment;

displaying the visualization screen corresponding to the first instruction accepted in the accepting of the first instruction on a preset display unit;

accepting, after the display of the visualization screen corresponding to the first instruction in the displaying, as a second instruction, at least one instruction of the index addition instruction, the control change instruction, the display change instruction, and the comment addition instruction; and notifying, when the second instruction has been accepted in the accepting of the second instruction, a fact that the visualization screen has been changed to a preset notification destination, wherein when the accepted first instruction includes the index addition instruction displaying the visualization screen includes information of an index indicated by the index addition instruction, when the first instruction includes the control change instruction displaying the visualization screen includes information of the model controlled corresponding to the control change instruction, when the first instruction includes the display change instruction displaying the visualization screen includes information of the model displayed under a display condition corresponding to the display change instruction, and when the first instruction includes the comment addition instruction displaying the visualization screen including information of a comment indicated by the comment addition instruction.

14. A non-transitory computer-readable storage medium storing a program that causes a computer to execute an information processing method, the information processing method comprising:

accepting, as a first instruction, a change instruction for changing a visualization screen that visualizes a model representing preset physical entities, the change instruction including at least one instruction of an index addition instruction being an instruction for adding an evaluation index of the model, a control change instruction being an instruction for changing a control condition of the model, a display change instruction being an instruction for changing a display condition of the model, and a comment addition instruction being an instruction for adding a comment;

displaying the visualization screen corresponding to the first instruction accepted in the accepting of the first instruction on a preset display unit;

accepting, after the display of the visualization screen corresponding to the first instruction in the displaying, as a second instruction, at least one instruction of the index addition instruction, the control change instruction, the display change instruction, and the comment addition instruction; and notifying, when the second instruction has been accepted in the accepting of the second instruction, a fact that the visualization screen has been changed to a preset notification destination, wherein when the accepted first instruction includes the index addition instruction displaying the visualization screen includes information of an index indicated by the index addition instruction, when the first instruction includes the control change instruction displaying the visualization screen includes information of the model controlled corresponding to the control change instruction, when the first instruction includes the display change instruction displaying the visualization screen includes information of the model displayed under a display condition corresponding to the display change instruction, and when the first instruction includes the comment addition instruction displaying the visualization screen including information of a comment indicated by the comment addition instruction.

* * * * *